(12) United States Patent
Welch et al.

(10) Patent No.: US 9,128,116 B2
(45) Date of Patent: Sep. 8, 2015

(54) AUTOMATIC ALIGNMENT OF A VEHICLE THREE-AXES ACCELEROMETER

(71) Applicant: HTI IP, L.L.C., Arlington, VA (US)

(72) Inventors: Stephen Christopher Welch, Atlanta, GA (US); James Ronald Barfield, Jr., Atlanta, GA (US)

(73) Assignee: HTI IP, L.L.C., Atlanta, GA (US)

( * ) Notice: Subject to any disclaimer, the term of this patent is extended or adjusted under 35 U.S.C. 154(b) by 273 days.

(21) Appl. No.: 13/936,120

(22) Filed: Jul. 5, 2013

(65) Prior Publication Data

US 2015/0007632 A1 Jan. 8, 2015

(51) Int. Cl.
*G01P 21/00* (2006.01)
*G01P 15/00* (2006.01)
*G01C 25/00* (2006.01)

(52) U.S. Cl.
CPC .............. *G01P 21/00* (2013.01); *G01C 25/005* (2013.01); *G01P 15/00* (2013.01)

(58) Field of Classification Search
None
See application file for complete search history.

(56) References Cited

U.S. PATENT DOCUMENTS

| 4,749,157 | A  | * | 6/1988  | Neufeld .......................... 244/171 |
|-----------|----|---|---------|-------------------------------------------|
| 5,396,797 | A  | * | 3/1995  | Hulsing, II ................... 73/504.04  |
| 6,295,870 | B1 | * | 10/2001 | Hulsing, II ................... 73/514.37  |
| 2006/0156810 | A1 | * | 7/2006 | Brett et al. ................... 73/382 G |
| 2009/0217733 | A1 | * | 9/2009 | Stachow et al. ................. 73/1.37 |
| 2009/0281756 | A1 | * | 11/2009 | Weed et al. .................... 702/104 |
| 2011/0029275 | A1 | * | 2/2011 | Kennedy et al. ............... 702/141 |
| 2011/0264393 | A1 | * | 10/2011 | An et al. ....................... 702/104 |
| 2014/0278191 | A1 | * | 9/2014 | Anderson ...................... 702/104 |

OTHER PUBLICATIONS

Eric Vinande et al., "Mounting-Angle Estimation for Personal Navigation Devices," IEEE Transactions on Vehicular Technology, vol. 59, No. 3, Mar. 2010.

* cited by examiner

*Primary Examiner* — Andre Allen

(57) ABSTRACT

The axes of an accelerometer, installed in a vehicle at an arbitrary orientation, may be realigned to the coordinate frame of the vehicle. In one implementation, a method may include determining, based on acceleration measurements from the accelerometer that likely corresponds to stopping, a dominant orientation of the accelerometer in relation to gravity, including calculating a first transformation angle and a second transformation angle as parameters to perform coordinate realignment of a coordinate frame of the accelerometer to a coordinate frame of the vehicle. The method may further include identifying, based on the acceleration measurements, an occurrence of acceleration events of the vehicle; determining, based on an analysis of the acceleration events, a third transformation angle; and storing the first, second, and third transformation angles.

24 Claims, 9 Drawing Sheets

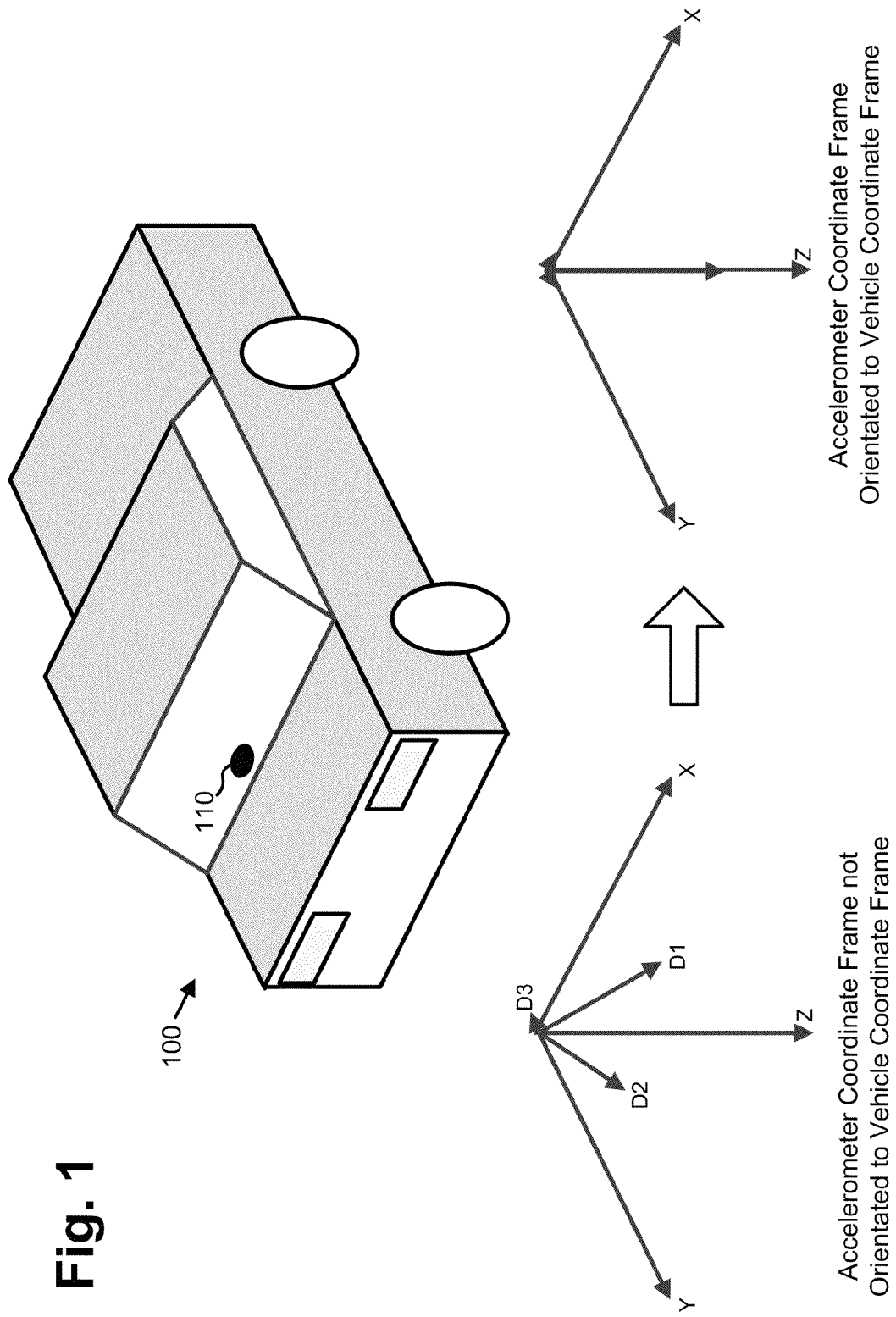

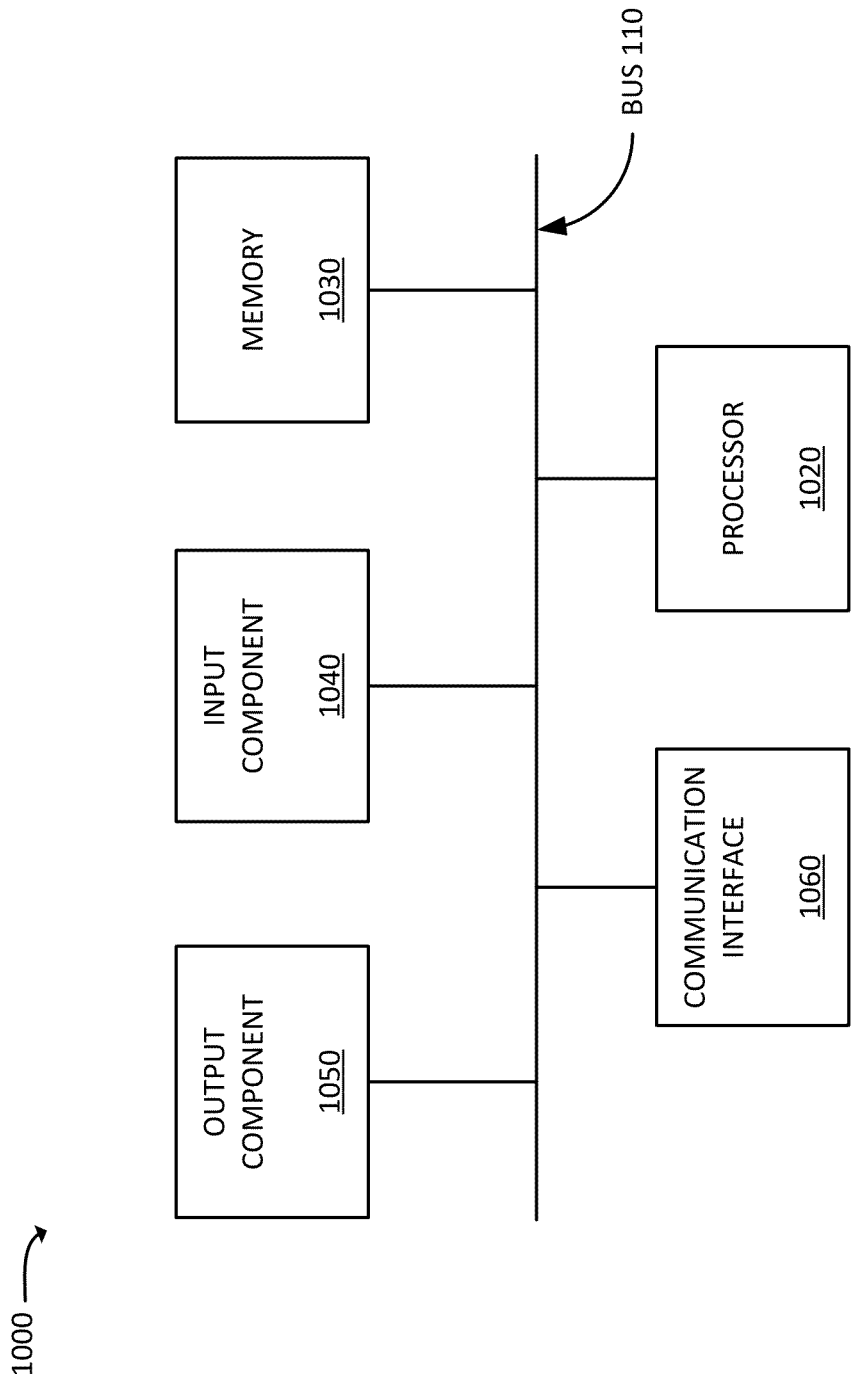

AUTOMATIC ALIGNMENT OF A VEHICLE THREE-AXES ACCELEROMETER

BACKGROUND

Accelerometers are devices that measure acceleration. Accelerometers may be used in vehicles as part of the collection of diagnostic data, the monitoring of performance of the vehicle, or as part of a control system of the vehicle.

Accelerometers may measure proper acceleration, which is the acceleration experienced by the accelerometer relative to freefall. An accelerometer may output the measured proper acceleration as three values, corresponding to the measured acceleration values along orthogonal axes of the accelerometer. When installing or placing an accelerometer in a vehicle, it can be important to be able to determine the relationship between the coordinate frame of the vehicle and the coordinate frame of the accelerometer. More particularly, in order to be able to take useful acceleration measurements, the coordinate frame of the accelerometer and the coordinate frame of the vehicle should be oriented with one another.

In high end installations, the physical accelerometer may be carefully placed and secured in a vehicle to guarantee orientation of the coordinate frame of the accelerometer and the coordinate frame of the vehicle. This type of installation of an accelerometer may not be possible or practical in all situations, such as with consumer grade vehicles (e.g., consumer automobiles).

BRIEF DESCRIPTION OF THE DRAWINGS

FIG. 1 is a diagram conceptually illustrating an example of an overview of concepts described herein;

FIG. 10 is a diagram of example components of a device.

DETAILED DESCRIPTION OF PREFERRED EMBODIMENTS

Figure 2A:
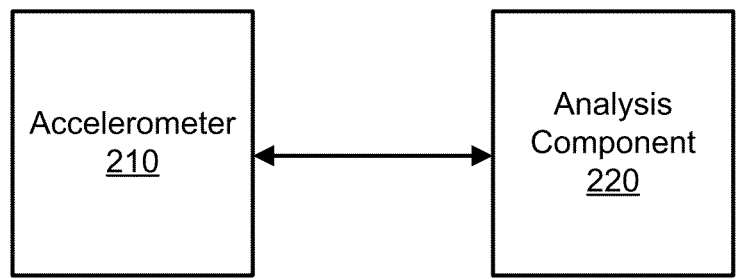
FIG. 2A is a diagram conceptually illustrating one example of an implementation of a three axes accelerometer for a vehicle.

The following detailed description refers to the accompanying drawings. The same reference numbers in different drawings may identify the same or similar elements.

Techniques described herein relate to the aligning of the axes of an accelerometer, such as an accelerometer installed in a vehicle, to the axes of the vehicle. The accelerometer may be mounted in any orientation with respect to the coordinate frame of the vehicle. The alignment may be performed without requiring external data, such as information from a Global Positioning System (GPS). Based on the alignment, subsequently acquired accelerometer data may be transformed to acceleration values given with respect to the coordinate frame of the vehicle.

FIG. 1 is a diagram conceptually illustrating an example of an overview of concepts described herein. A vehicle 100 may include an accelerometer 110 mounted within or on the vehicle (i.e., an automobile, a bike, a train, a plane, a motorcycle, or other transportation device that accelerates and decelerates). For example, accelerometer 110 may be a three axis accelerometer that measures proper acceleration. Accelerometer 110 may be mounted on a dashboard, a mirror, or at another location within the vehicle. Accelerometer 110 may be installed during manufacture of vehicle 100 or as a post-manufacture installation of an aftermarket device that couples to a communication bus of the vehicle, for example a telematics dongle installed by the driver to couple to the communication bus through an onboard diagnostic (OBD) port, such as an OBD-II connector, of the vehicle. As an example of the use of an accelerometer 110 within vehicle 100, it may be desirable to judge how much force acts on a vehicle as it stops, when it accelerates, or as it turns.

It may be desirable for the data output from accelerometer 110 to represent forces aligned with the primary axes of vehicle 100. As used herein, the primary axes of vehicle 100 will be referred to as the X, Y, and Z axis, in which the Y axis is parallel with the forward motion of vehicle 100, the Z axis is parallel with the force of gravity, and the X axis is orthogonal to the Y axis and Z axis (e.g., approximately parallel to the front and back bumpers, of vehicle 100).

When initially mounted, accelerometer 110 may be at an arbitrary orientation with respect to the axes of vehicle 100. For example, as shown in FIG. 1, the coordinate frame of accelerometer 110 (illustrated as orthogonal axes D1, D2, and D3) may not be oriented with the vehicle coordinate frame (illustrated as orthogonal axes X, Y, and Z).

Consistent with aspects described herein, data from accelerometer 110 (e.g., acceleration values) may be analyzed to determine a transformation to orient the coordinate frame of accelerometer 110 to the vehicle coordinate frame. The determination of the transformation may be based on an initial alignment, determined based on the effect of gravity, of the Z-axis of vehicle 100 to the axes of the accelerometer. The output values of accelerometer 110 may further be analyzed to determine acceleration events with respect to vehicle 100. In particular, stopping events (e.g., corresponding to a driver de-accelerating at a stop sign or stop light) may be identified and used to complete the determination of the transformation needed to orient the coordinate frame of accelerometer 110 to the coordinate frame of vehicle 100. Subsequent acceleration values, output from accelerometer 110, may be transformed to obtain acceleration values corresponding to the X, Y, and Z axes of the vehicle.

FIG. 2A is a diagram conceptually illustrating one example of an implementation of a three axes accelerometer for a vehicle. As shown in FIG. 2A, accelerometer 210 may communicate with analysis component 220. Accelerometer 210 may be an accelerometer that measures proper acceleration. Analysis component 220 may include, for example, one or more processors and computer readable media, such as a processor associated with an external computing device (e.g., laptop, smart phone, etc.) that are connected accelerometer 210. Analysis component 220 may function, as described in more detail below, to transform the measured acceleration values, from accelerometer 210, to acceleration values that are aligned with the coordinate frame of vehicle 100. The transformed acceleration values may be stored and/or output to a user.

Figure 2B:
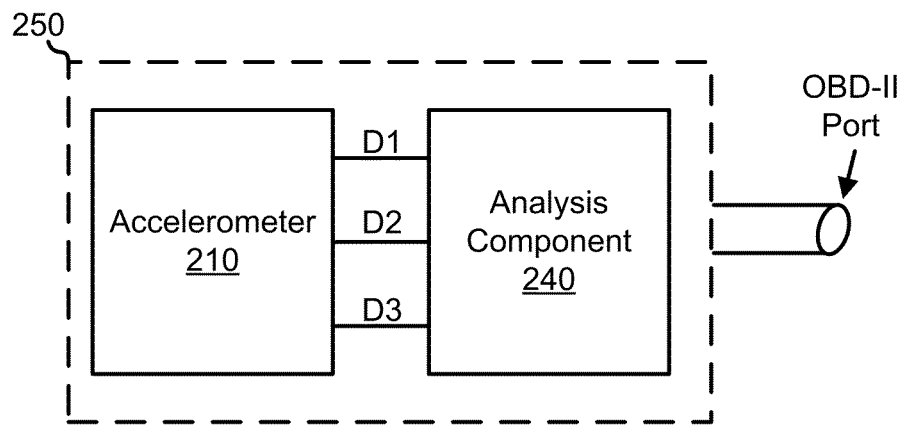
FIG. 2B is a diagram conceptually illustrating a second example of an implementation of a three axes accelerometer for a vehicle.

FIG. 2B is a diagram conceptually illustrating a second example of an implementation of a three axes accelerometer for a vehicle. In contrast to the implementation shown in FIG. 2A, in FIG. 2B, accelerometer 210 and analysis component 240 may be included as a single integrated unit 250. Integrated unit 250 may include an integrated circuit (IC) or other integrated unit in which, from a perspective of a user, the measured acceleration values may be automatically transformed to values that are aligned with the coordinate frame of vehicle 100. Analysis component 240 may include, for example, one or more processors and computer readable media, an application specific integrated circuit (ASIC), or other circuitry designed to transform the acceleration values measured by accelerometer 210. Integrated unit 250 may connect to an onboard diagnostic II (OBD-II) port to, for example, obtain power and/or to obtain vehicle diagnostic information (e.g., such as vehicle diagnostic information provided over a CAN BUS). In some implementations, the transformed acceleration values, or other diagnostic values, may be transmitted wirelessly to other devices (e.g. through cellular connection, Bluetooth, connections or other short range or long range communications schemes).

Figure 3:
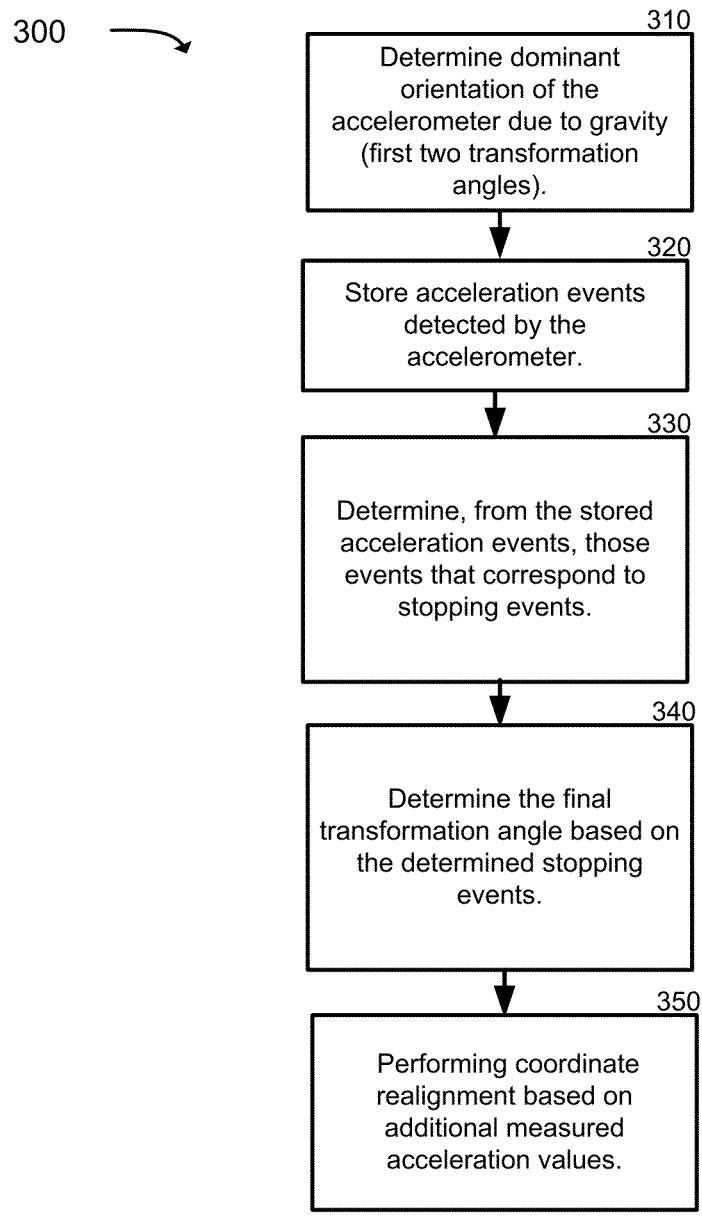
FIG. 3 is a flow chart illustrating an example process that may be performed to transform measured acceleration values to acceleration values that are aligned with the coordinate frame of a vehicle.

FIG. 3 is a flow chart illustrating an example process 300 that may be performed to transform measured acceleration values to acceleration values that are aligned with the coordinate frame of a vehicle. Process 300 may be performed, for example, by one or more computing devices or circuits that receive measured acceleration values from an accelerometer 210 (e.g., by one of the implementations illustrated in FIGS. 2A and 2B). The orientation of accelerometer 210, with respect to vehicle 100, does not need to be known prior to the operation of process 300.

Coordinate realignment (i.e., the transformation of the measured acceleration values to acceleration values that are aligned with the coordinate frame of the vehicle) may be performed based on the following equations:

$$C_v^a = \begin{bmatrix} \cos\theta_s\cos\psi_s & \cos\theta_s\sin\psi_s & -\sin\theta_s \\ \cos\psi_s\sin\theta_s\sin\phi_s - \cos\psi_s\cos\phi_s & \cos\psi_s\cos\phi_s + \sin\psi_s\sin\theta_s\sin\phi_s & \cos\theta_s\cos\phi_s \\ \cos\psi_s\sin\theta_s\sin\phi_s - \sin\psi_s\sin\phi_s & \sin\psi_s\sin\theta_s\cos\phi_s - \cos\psi_s\sin\phi_s & \cos\theta_s\cos\phi_s \end{bmatrix}, \text{ and} \quad (1)$$

$$f_v = (C_v^a)^{-1} f_a. \quad (2)$$

In equations (1) and (2), $f_v$ is the length three force vector in the vehicle coordinate frame, $f_a$ is the length-three force vector (i.e., the measured acceleration values) in the accelerometer coordinate frame, and $(C_v^a)^{-1}$ in the inverse of matrix $C_v^a$. As can be seen from equations (1) and (2), three transformation angles, theta ($\theta_s$), phi ($\phi_s$), and psi ($\psi_s$) may be needed to transform the measured acceleration values, represented by $f_a$, to the desired acceleration values, $f_v$.

Process 300 may include determining the dominant orientation of the accelerometer due to gravity (block 310). Accelerometer 210 may generate relatively constant "base line" acceleration values due to gravity. The base line acceleration values may be determined, for example, based on a calculation of a running mean value corresponding to a number of measurements of $f_a$. The base line acceleration values may be used to determine the dominant orientation of the accelerometer due to gravity (i.e., the Z axis). With respect to equations (1) and (2), theta and phi (the first two transformation angles) may be determined. With reference to FIG. 1, the orientation of vehicle 100 may be determined with respect to the Z axis (e.g., the orientation of vehicle 100 with the X-Y plane may still be unknown).

Process 300 may further include storing acceleration events detected by accelerometer 210 (block 320). The acceleration events may include events relating to acceleration of vehicle 100. For example, for an automobile, typical acceleration events may include speeding up, breaking, and turning. Acceleration associated with these events may generally be in the X-Y plane.

Process 300 may further include determining, from the stored events, events that correspond to stopping events (block 330). Drivers of vehicles 100, such as automobiles, may tend to stop without turning more frequently than they accelerate without turning. Additionally, the direction of the force of acceleration in the X-Y plane observed during stopping events may tend to correspond to the direction of travel of vehicle 100. Consistent with aspects described herein, these observations may be exploited to determine the direction of stopping in the orientation of the accelerometer 210 with respect to vehicle 100.

Process 300 may further include determining the final (e.g., the third) transformation angle based on the determined stopping events (block 340). Because the stopping events may generally correspond to the direction of travel of vehicle 100, stopping events may be used to orient vehicle 100 in the X-Y plane. The third transformation angle (e.g., psi) may thus be determined.

In some implementations, events other than stopping events may be determined and used to determine the third transformation angle (psi). For example, different types of vehicles (e.g., watercraft, motorcycles, etc.) may tend to exhibit different acceleration patterns, and thus different acceleration events may be used to align the vehicle with the direction of travel in the X-Y plane.

Process 300 may further include performing coordinate realignment based on additional measured acceleration values (block 350). Coordinate realignment may be performed by transforming the measured acceleration values, $f_a$, using the determined transformation angles, theta, phi, and psi (e.g., using equations (1) and (2)). In some implementations, process 300 may be continuously repeated and used to refine the theta, phi, and psi values based on additional acceleration measurements from accelerometer 210.

Figure 4:
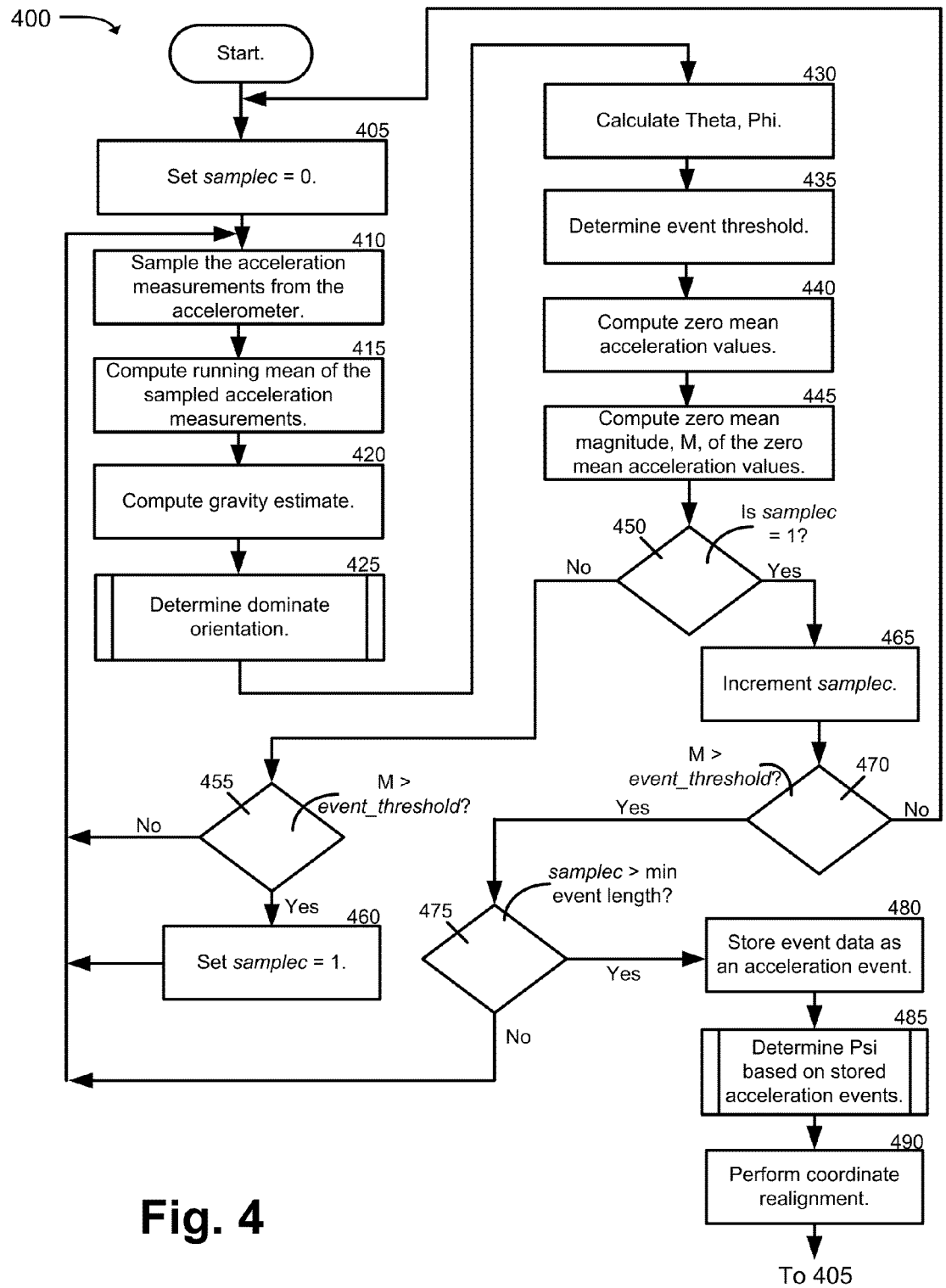
FIG. 4 is a flow chart illustrating a second example of a process that may be performed to transform measured acceleration values to acceleration values that are aligned with the coordinate frame of a vehicle.

FIG. 4 is a flow chart illustrating an example process 400 that may be performed to transform measured acceleration values to acceleration values that are aligned with the coordinate frame of a vehicle. Process 400 may correspond to an example of a more detailed implementation of process 300. Process 400 may be performed, for example, by one or more computing devices and/or circuits that receive measured acceleration values from an accelerometer (e.g., by one of the implementations illustrated in FIGS. 2A and 2B).

Process 400 may include setting the variable, samplec, to zero (block 405). The variable samplec may be used to keep track of the number of samples that correspond to an acceleration event that is occurring. Process 400 may further include sampling the acceleration measurement from the accelerometer (block 410). For example, analysis component 220/240 may periodically (e.g., at a 50 Hz sampling frequency) sample three axes acceleration values from accelerometer 210. In some implementations, the samples may be stored in a first-in first-out (FIFO) buffer and/or another type of buffer (e.g., a circular buffer).

Process 400 may include computing the running mean of the sampled acceleration measurements (block 415). The running mean, as used herein, may refer to the mean of a given number (e.g., N) of data samples, such as the mean of the most recent N data samples, where the running mean may be updated after every new sample or after every predetermined number of new samples. In one implementation, the running mean may be updated as the samples are output from the FIFO buffer. The running mean may be calculated on a per-axis basis. For example, for each axis, the running mean may be calculated by summing all measured acceleration values (or a certain number of the most recent measured acceleration values), and dividing by the corresponding number of samples. In other implementations, other techniques for calculating values similar to a running mean, such as a weighted moving average or exponential moving average, may alternatively be used. The running mean values for each axis of accelerometer 210 may be designated as RUNNING_MEAN_X, RUNNING_MEAN_Y, and RUNNING_MEAN_Z.

Process 400 may further include computing a gravity estimate (block 420). The gravity estimate, which may be stored in the variable gravity_estimate, may be calculated as:

stored by analysis component 220 or 240. One example of such a lookup table is illustrated in Table I, below.

TABLE I

Dominant Orientation Determination

| Largest Running Mean Component | Sign | X Assignment | Y Assignment | Z Assignment | Orientation Index |
|---|---|---|---|---|---|
| X | + | $f_{s3}$ | $f_{s2}$ | $f_{s1}$ | 1 |
| X | − | $f_{s3}$ | $f_{s1}$ | $f_{s2}$ | 2 |
| Y | + | $f_{s2}$ | $f_{s3}$ | $f_{s1}$ | 3 |
| Y | − | $f_{s1}$ | $f_{s3}$ | $f_{s2}$ | 4 |
| Z | + | $f_{s2}$ | $f_{s1}$ | $f_{s3}$ | 5 |
| Z | − | $f_{s1}$ | $f_{s2}$ | $f_{s3}$ | 6 |

Six unique possible orientations are illustrated in Table I. Values for the three axes of accelerometer 210 (X, Y, and Z) may be assigned new variable names, depending upon the chosen orientation. These variable names will be used in the calculations described below.

$$\text{gravity\_estimate} = \sqrt{\text{RUNNING\_MEAN\_X}^2 + \text{RUNNING\_MEAN\_Y}^2 + \text{RUNNING\_MEAN\_Z}^2} \qquad (3)$$

Process 400 may further include determining the dominant orientation (block 425). Determination of the dominant orientation may correspond to determining that mapping of accelerometer acceleration axes to the vehicle acceleration axes. One example implementation of block 420 is illustrated, in additional detail, in FIG. 5.

Figure 5:
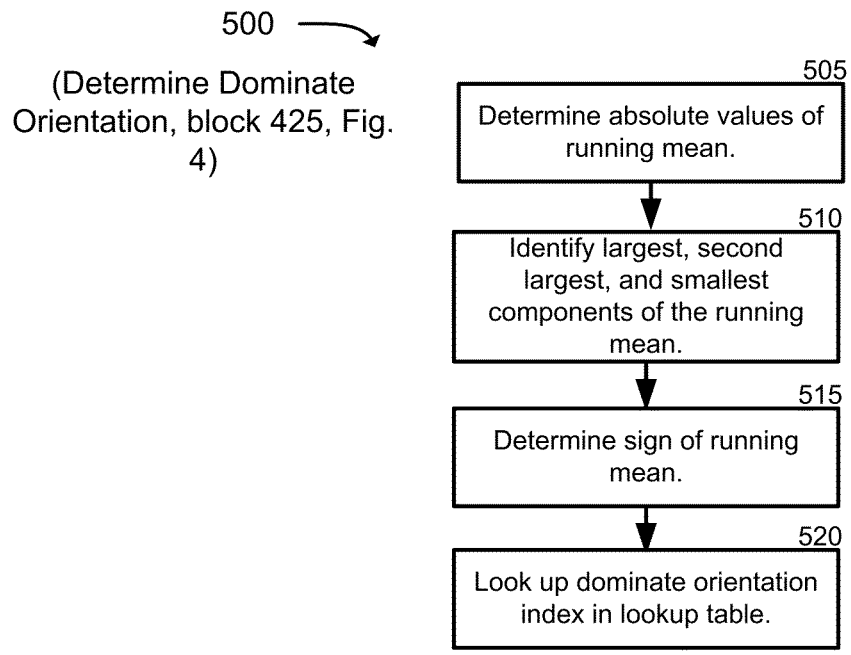
FIG. 5 is a flow chart illustrating an example process for determining a dominant orientation.

FIG. 5 is a flow chart illustrating an example process 500 for determining a dominate orientation (e.g., as performed in block 425, FIG. 4). Process 500 may include determining absolute values of the running mean (block 505). As mentioned, a running mean value may be computed for each of the three measured axes of accelerometer 210. The absolute value may be taken for each axis. Process 500 may include identifying the largest, second-largest, and smallest components of the absolute values of the running mean for each axis (block 510). For instance, absolute values of the running mean for each axis may be sorted in descending order. The sign of the running mean (e.g., positive or negative) may also be determined (block 515).

Process 500 may further include, based on the sorted components of the absolute value of the running mean (block 510), and based on the determined sign (block 515), determining a dominant orientation index based on reference to a lookup table (block 520). The table may be a table that is Referring back to FIG. 4, the transformation angles theta and phi may be calculated (block 430). In one implementation, theta and phi may be calculated using the following equations (4) and (5):

$$\theta_s = \operatorname{atan}\left(\frac{f_{s_1}}{\sqrt{f_{s_2}^2 + f_{s_3}^2}}\right) \qquad (4)$$

$$\phi_s = \operatorname{atan2}(-f_{s_2}, -f_{s_3}) \qquad (5)$$

As illustrated in the equations, theta ($\theta_s$) may be calculated, using equation (4), and based on the measured acceleration values as assigned via the lookup using Table I. Similarly, phi ($\phi_s$) may be calculated, using equation (5), and based on the measured acceleration values as assigned via the lookup using Table I.

Process 400 may further include determining an event threshold (block 435). A variable event_threshold may be defined and used to store a threshold value indicating when an amount of acceleration, as measured by accelerometer 210, is large enough to indicate the occurrence of an acceleration event (e.g., breaking, turning, speeding up). In one implementation, event_threshold may be set based on a predetermined constant multiplied by gravity_estimate (equation (3)). In other possible limitations, event_threshold may be determined using other techniques, such as based on a predetermined value or based on an analysis of previous acceleration measurements that are known to be events based on other factors (e.g., user input).

Process 400 may further include computing zero mean acceleration values (block 440). In one implementation, the zero mean acceleration value may be calculated, for each axis, as the most recently measured acceleration value minus the running mean of the sampled acceleration measurements (as computed in block 415). The zero mean acceleration values may thus represent the current acceleration values, as measured by accelerometer 210, and adjusted for mean acceleration (e.g., due to gravity). The zero mean acceleration values may be represented using the variables: ZERO_MEAN_X, ZERO_MEAN_Y, and ZERO_MEAN_Z.

Process 400 may further include computing the zero mean magnitude of the zero mean acceleration values (block 445). The zero mean magnitude value, M, may be calculated as:

$$M = \sqrt{ZERO\_MEAN\_X^2 + ZERO\_MEAN\_Y^2 + ZERO\_MEAN\_Z^2} \quad (6)$$

The zero mean magnitude, M, as described below, may be used in conjunction with event_threshold to determine whether an acceleration event is occurring.

Process 400 may further include determining whether samplec (initially set in block 405) is equal to one (block 450). When samplec is not equal to one (block 445—NO), this may indicate that an acceleration event is not currently occurring. Process 400 may further include determining whether the calculated zero magnitude value, M, is greater than the event threshold value (event_threshold) (block 455). When M is greater than event_threshold (block 455—YES), samplec may be set to one (block 460). Setting samplec, in block 460, may indicate the beginning of an acceleration event. Process 400 may then return to block 410. When M is not greater than event_threshold (block 455—NO), process 400 may also return to block 410.

When samplec is equal to one (block 450—YES), this may indicate that an acceleration event is currently occurring, and samplec may be incremented (e.g., increased by one) to indicate the length of the ongoing acceleration event (block 465). Process 400 may further include determining whether an acceleration event is still ongoing. In particular, process 400 may further include determining whether the calculated zero magnitude value, M, is greater than the event threshold value (event_threshold) (block 470).

When M is not greater than event_threshold (block 470—NO), the process flow may return to block 405. When M is greater than event_threshold (block 470—YES), process 400 may include determining whether samplec is greater than a minimum event length (block 475). In one implementation, the value for the minimum event length may be predetermined, such as a value determined by a designer and based on analysis of typical acceleration events for vehicle 100. Alternatively or additionally, the value for the minimum event length may be dynamically determined by analysis component 220/240. The value for the minimum event length may be set at a value that corresponds to a minimum number of consecutive acceleration samples, above event_threshold, that represent an acceleration event (e.g., braking, turning, speeding up) by vehicle 100.

When samplec is determined to not be greater than the minimum event length (block 475—NO), process 400 may return to block 410. When samplec is determined to be greater than the minimum event length (block 475—YES), process 400 may include storing the corresponding event data as an acceleration event (block 480). The acceleration event may be an acceleration event that meets the minimum event length (block 475) and minimum acceleration magnitude (block 470) criteria. Analysis component 220/240 may thus store the acceleration values corresponding, the detected acceleration event.

Process 400 may further include, based on the stored acceleration events, determining psi (block 485). As mentioned, psi may correspond to the final transformation angle that is needed to perform coordinate realignment from the coordinate frame of accelerometer 210 to the coordinate frame of vehicle 100. A number of different techniques may be used to determine psi. One such technique is described below with reference to FIG. 6. A second example of such a technique is described below with reference to FIGS. 7-9.

Process 400 may further include performing coordinate realignment (block 490). Coordinate realignment may be performed, for the values measured by accelerometer 210, to transform the measured acceleration values to the reference frame of vehicle 100. Coordinate realignment may be performed using, for example, equations (1) and (2). The transformed acceleration values may be output, such as from integrated unit 250, for use in vehicle diagnostics, performance measurements, or for other purposes.

Figure 6:
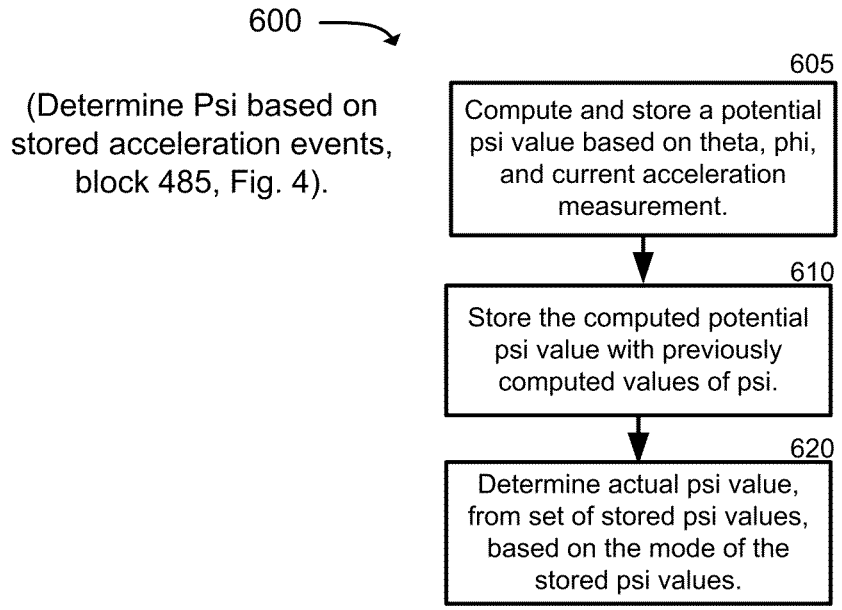
FIG. 6 is a flow chart illustrating an example process for determining a third transformation angle.

FIG. 6 is a flow chart illustrating an example process 600 for determining psi (e.g., as performed in block 485, FIG. 4). Process 600 may include computing and storing a potential psi value based on theta, phi, and the current acceleration measurement (block 605). The current acceleration measurement may refer to the acceleration measurements sampled in block 410 (FIG. 4) and oriented based on the orientation determined in Table I. In one implementation, the potential psi value may be calculated using the equations:

$$\begin{bmatrix} \dfrac{f_{s_1} - g\sin\theta_s}{\cos\theta_s} \\ f_{s_2} + g\cos\theta_s\sin\phi_s \\ f_{s_3} + g\cos\theta_s\cos\phi_s \end{bmatrix} = \begin{bmatrix} 1 & 0 \\ \sin\theta_s\sin\phi_s & -\cos\phi_s \\ \sin\theta_s\cos\phi_s & \sin\phi_s \end{bmatrix} \begin{bmatrix} B \\ C \end{bmatrix} \quad (7)$$

$$\psi_s = \operatorname{atan2}\left(\dfrac{C}{B}\right) \quad (8)$$

Here, g may refer to acceleration due to gravity. Equation (8) is an overdetermined system and may be solved using a method such as the least-squares method. Equations (7) and (8) may be used to produce a value for psi that corresponds to the direction of the force acting on vehicle 100. Typical motorist driving behavior allows for maneuvers that may produce force in almost any direction perpendicular to the force of gravity (e.g., stopping, turning, accelerating). Equations (7) and (8) may estimate angles in the direction of force on vehicle 100, and not necessarily in the direction vehicle 100 is traveling. As mentioned previously, for stopping events, however, psi may correspond to the direction of travel. Further, drivers typically stop without turning more frequently than they accelerate without turning.

Process 600 may further include storing the computed potential psi value with the previously computed potential psi values (block 610). In this manner, a history of psi values, corresponding to acceleration events of vehicle 100, may be stored.

Process 600 may further include determining the actual psi value, from the set of stored psi values, based on the mode of this stored psi values (block 620). Because the potential psi values may be stored across multiple acceleration events, the most dense, or most populated, cluster of psi values from the set of stored psi values may tend to correspond to stopping events, which may correspond to psi being aligned with the direction of travel of vehicle 100.

In one implementation, the mode of the potential psi value may be calculated by categorizing the set of stored psi values into bins, and choosing the center of the bin with the most values as the actual psi value. As used herein, categorizing the values may refer to binning the values, such as by creating a histogram of the values. Alternatively or additionally, categorizing may include the application of clustering techniques that may be performed on the set of stored psi values to obtain clusters (categories) of psi values. The cluster with the most psi values may be used to obtain the actual psi value.

Figure 7:
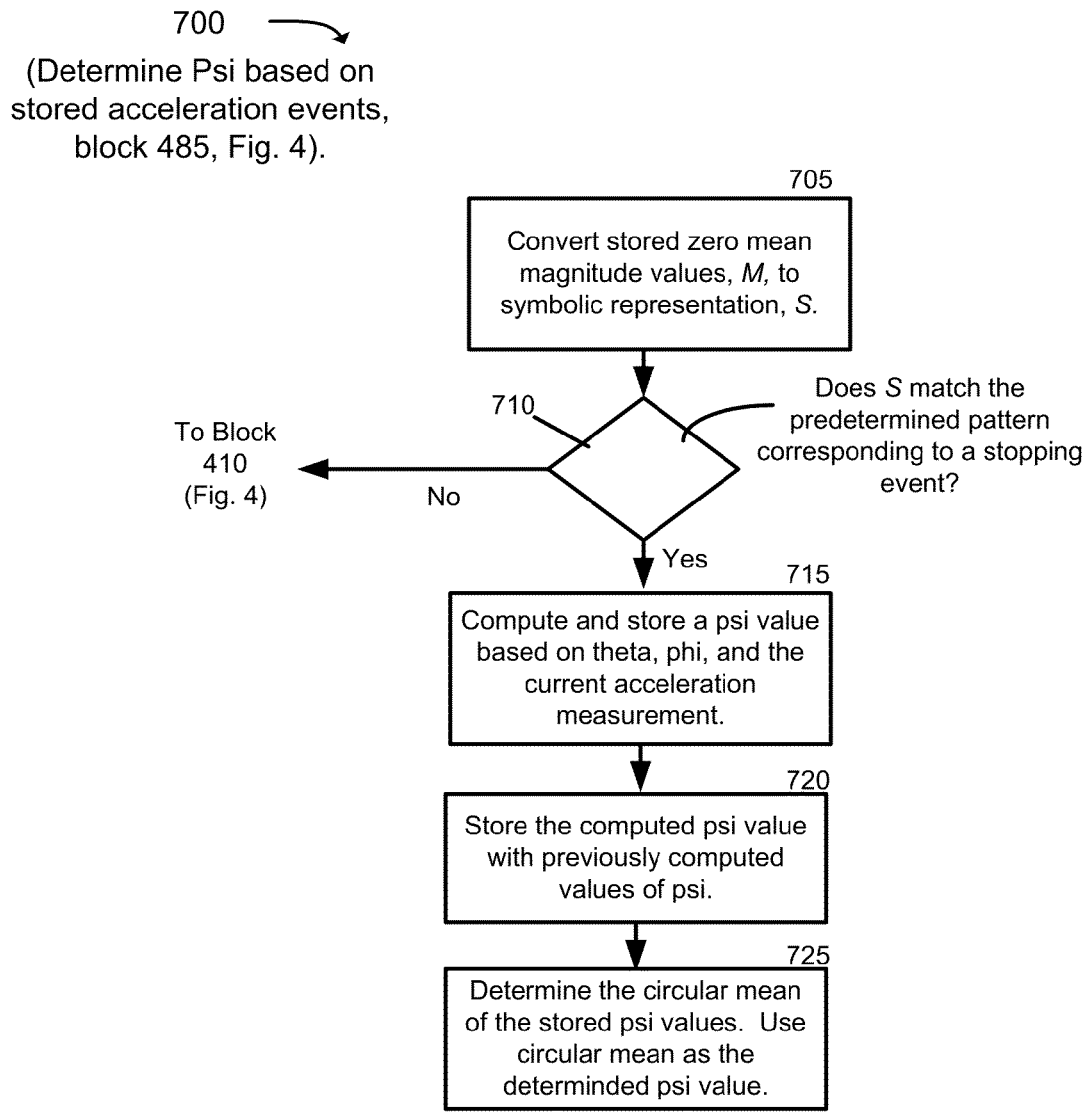
FIG. 7 is a flow chart flow chart illustrating an example process for determining a third transformation angle based on pattern recognition of previously classified patterns.
Figure 9:
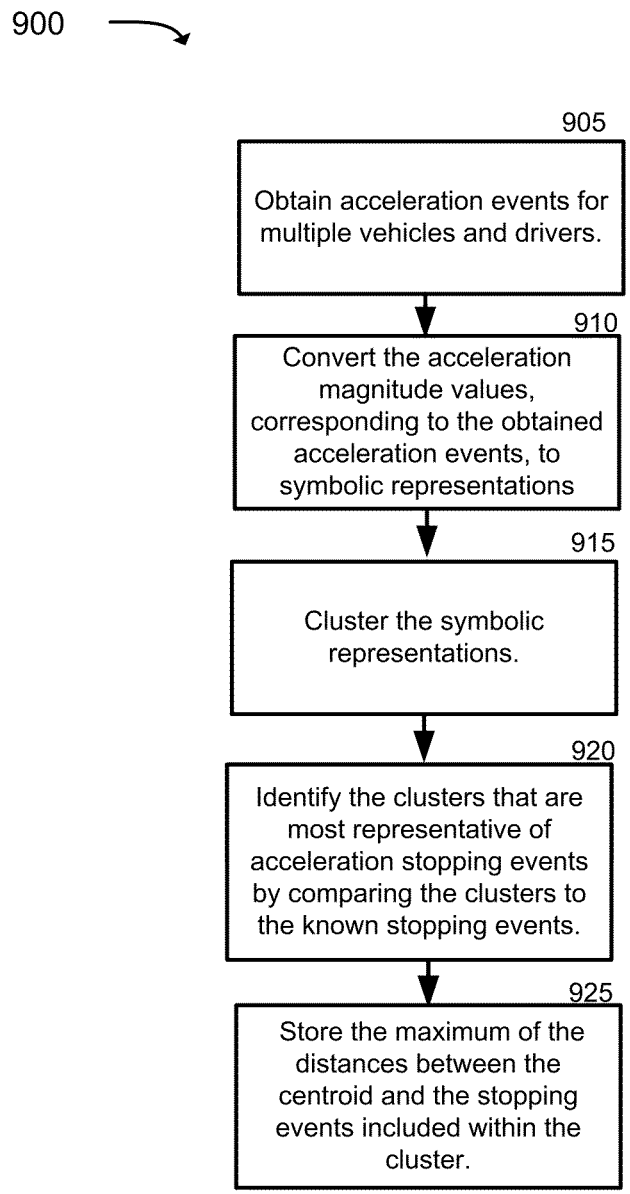
FIG. 9 is a flow chart flow chart illustrating an example process for determining the pattern classifications used during the process shown in FIG. 7.

FIGS. 7 and 9 are flow charts illustrating example processes, according to a second potential implementation, for determining psi (e.g., as performed in block 485, FIG. 4). In general, in this implementation, pattern recognition techniques may be used to discriminate between the stored acceleration events. For example, pattern recognition techniques may be used to determine which detected acceleration events correspond to stopping events (e.g., to acceleration events in the direction of travel of vehicle 100).

FIG. 7 is a flow chart flow chart illustrating an example process 700 for determining psi based on pattern recognition of previously classified patterns. FIG. 9 is a flow chart illustrating an example process 900 for determining the pattern classifications used during process 700.

Process 700 may include converting stored zero mean magnitude values, M, to symbolic representations S (block 705). In one implementation, the stored zero mean magnitude values, M, may include one or more zero mean magnitude values corresponding to a particular detected acceleration event. As previously discussed, each acceleration event may correspond to a number (e.g., at least minimum event length) of samples. In one example implementation, the values of the samples may be quantized so that both the sample values and the time scale of the sample values may be divided into a predetermined number of discrete regions. The predetermined regions may correspond to a symbolic representation of the acceleration event.

Figure 8B:
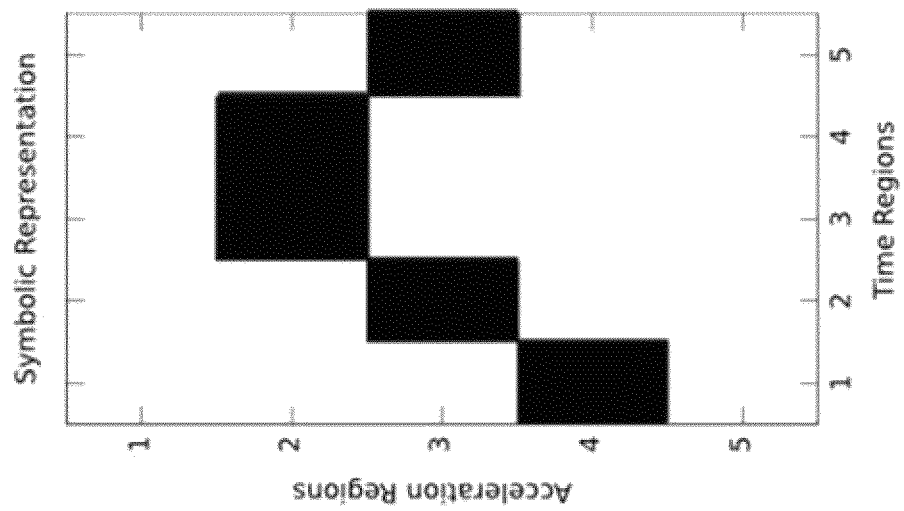
FIGS. 8A and 8B are diagrams illustrating an example of a symbolic representation of an acceleration event.
Figure 8A:
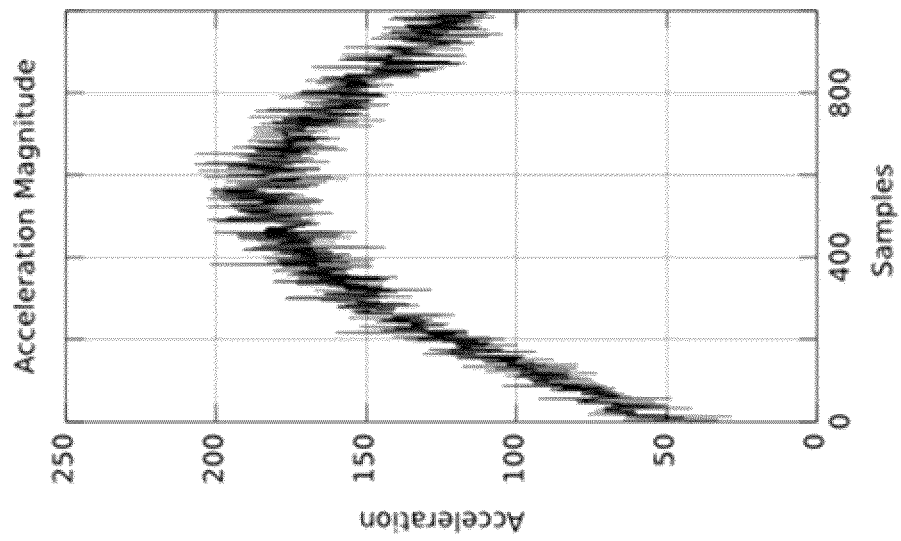

FIGS. 8A and 8B are diagrams illustrating examples of symbolic representations of an acceleration event. As illustrated in FIG. 8A, an acceleration event is represented as a time series of real valued acceleration magnitude measurements. The acceleration measurements may be grouped into time periods, such as the acceleration measurements corresponding to samples zero-200, the acceleration measurements corresponding to samples 201-400, etc. The samples for each group may then be classified as a single acceleration value, such as a value determined based on the average acceleration value of the group (e.g., an average calculated based on a square root of the sum of the squares of the values). In this manner, quantization may be performed on the time series corresponding to the measured acceleration magnitudes to obtain a simplified symbolic representation. An example of a symbolic (quantized) representation corresponding to the time series shown in FIG. 8A is illustrated in FIG. 8B. As illustrated, the symbolic representation ("S") may be represented as the pattern: 4, 3, 2, 2, 3. The symbolic representation shown in FIG. 8B may allow for simplified comparison and pattern matching between different acceleration events. In other possible implementations, other techniques may be used to perform matching of symbolic patterns between acceleration events.

Referring back to FIG. 7, process 700 may further include determining whether the symbolic representation, S, matches a predetermined symbolic pattern corresponding to a stopping event (block 710). The predetermined pattern may be determined using, for example, the process shown in FIG. 9 (described in more detail below). In one implementation, the predetermined pattern may include an indication of a cluster centroid, D, corresponding to a number of known stopping events. Determining whether the symbolic representation, S, matches the predetermined pattern may include computing the Euclidean distance between S and D. When the Euclidean distance is below a threshold value (e.g., a maximum cluster distance value), S may be determined to match the pattern.

When the symbolic representation S is determined to not match the pattern (block 710—NO), process 700 may return to block 410 (FIG. 4). However, when the symbolic representation is determined to match the pattern (block 710—YES), process 700 may include computing and storing a psi value based on theta, phi, and the current acceleration measurement (block 715). The current acceleration measurement may refer to the acceleration measurements sampled in block 410 (FIG. 4) and oriented based on the orientation determined in Table I. In one implementation, the psi value may be calculated using equations (7) and (8). Equations (7) and (8) may be used to produce a value for psi that corresponds to the direction of the force acting on vehicle 100.

Process 700 may further include storing the computed psi value with the previously computed psi values (block 720). In this manner, a history of empirical psi values, corresponding to stopping acceleration events of vehicle 100, may be stored.

Process 700 may further include determining the circular mean of the stored psi values (block 725). The circular mean $\bar{\alpha}$ may be computed using the equation:

$$\bar{\alpha} = \operatorname{atan2}\left(\frac{1}{n}\sum_{j=1}^{n} \sin\alpha_j, \frac{1}{n}\sum_{j=1}^{n} \cos\alpha_j\right) \quad (9)$$

Here, $\bar{\alpha}$ is the circular mean of the vector $\alpha$ (e.g, a vector of the stored psi values), n is the length of $\alpha$, and $\alpha_j$ is the $j^{th}$ entry of $\alpha$. The computed circular mean of the psi values may be used as the determined psi value to use in coordinate realignment.

In alternative possible implementation, the distance between the representative cluster centroid, D, and a given acceleration event can be used in conjunction with the circular standard deviation of the acceleration event. The circular standard deviation may be defined as:

$$R = \sqrt{\left(\frac{1}{n}\sum_{j=1}^{n} \sin\alpha_j\right)^2 + \left(\frac{1}{n}\sum_{j=1}^{n} \cos\alpha_j\right)^2} \quad (10)$$

$$\bar{\sigma} = \sqrt{-2\ln(R)}$$

Where n is the length of the vector $\alpha$, and $\alpha_j$ is the $j^{th}$ entry of $\alpha$, and $\bar{\sigma}$ is the circular standard deviation of $\alpha$.

As previously mentioned, FIG. 9 is a flow chart flow chart illustrating an example process 900 for determining the pattern classifications used during process 700. In some implementations, process 900 may implemented during a training operation, such as one performed by designers of analysis component 220/240.

Process 900 may include obtaining acceleration events for multiple vehicles and drivers (block 905). For example, process 900 may be performed for multiple vehicles and drivers. In some implementations, the stored acceleration events (e.g., stored in block 480) may be associated with additional data that may use to classify the acceleration event. For example, video of the vehicle may be associated with each acceleration event. The video may be later reviewed, by a human, to definitively determine whether the vehicle is stopping, speeding up, or turning during the acceleration event. Other techniques for classifying the acceleration events include using data from sensors such as, for example, brake sensors, a steering wheel sensor, a speed sensor, a gyroscope, etc.). The data from the additional sensors may be directly obtained by analysis component 220/240 through the vehicle's OBD port or via a wireless link. As another example, during training, accelerometer 210 may be mounted in a known orientation so that the classification of the acceleration events can be directly determined from the acceleration values. As yet another example, a driver may manually annotate the acceleration events to classify the acceleration events. In some implementations, only acceleration events correspond to stopping events may be obtained and stored in block 905.

Process 900 may further include converting the acceleration magnitude values, corresponding to the obtained acceleration events, to symbolic representations (block 910). The conversion to symbolic representations may be performed using the same conversion technique applied for the run-time operation of process 700.

Process 900 may further include clustering the symbolic representations (block 915). For example, the clustering may be performed using a clustering technique such as the k-means clustering algorithm or another algorithm.

Process 900 may further include identifying clusters that are most representative of acceleration stopping events by comparing the clusters to the known stopping events (block 920). For example, a number of acceleration events in each cluster may be identified, and of the identified acceleration events for each cluster, the number or portion of the acceleration events that correspond to stopping events may be tabulated. The cluster containing the most, or with the highest percentage of known stopping events may thus be identified. This cluster may be referred to as the most representative cluster, and may be thought of as the archetype for an acceleration event class, such as stops. In other implementations, acceleration events other than stopping events may be clustered and classified.

Process 900 may further include storing the maximum of the distances between the centroid of the cluster with the greatest correlation to the known stopping events and the stopping events included within the cluster (block 925). The distances may refer to Euclidean distance, or alternatively, other distance metrics. The maximum distances (maximum cluster distance) and the centroid value, C, may be used in the run-time pattern matching techniques of block 710 (FIG. 7). In alternative implementations, other parameters may be output, via process 900, and used in process 700 to perform pattern matching.

The pattern-based techniques discussed above, with reference to FIGS. 7, 8A, 8B, and 9, in alternative implementations, may, in practice, be implemented differently. For example, instead of k-means clustering, other techniques to identify patterns may be used, such as: Neural Networks, Support Vector Machines, Regression Analysis, Logistic Regression, Gaussian Process Modeling, Treed Models, Principal Component Analysis, Independent Component Analysis, Hierarchical Clustering, and/or Sparse Autoencoder.

As described above, the reference frame of an arbitrarily positioned accelerometer in a vehicle may be aligned to the reference frame of the vehicle. The alignment may be performed based on data from the accelerometer (e.g., without reliance on other external data). Acceleration data measured by the accelerometer may be analyzed to determine acceleration events experienced by the vehicle. The acceleration events may be classified, such as to determine acceleration events relating to stopping of vehicle, and the classified acceleration events may be used to orient vehicle with respect to the X-Y plane (e.g., the plane perpendicular to the force of gravity).

Numerous parameters and thresholds may be used in the techniques described above. While the choice of these parameters may not change the core functionality of the techniques described herein, choosing parameters optimally, or near-optimally, can improve performance. Various optimization schemes may be used to improve overall performance by modifying parameters to minimize or maximize some objective function. In practice, desirable objective functions may include a set, or fraction of a set, of properly identified acceleration events, the average or median time required for process 400 to converge to product correct transformations, or other desirable measurable quantities. The parameters and thresholds may then be optimized by batch or stochastic gradient ascent, genetic optimization algorithms, simulated annealing, brute force optimization, or other optimization approaches. The effectiveness of optimization strategies may be improved by randomization, especially in the case where a large amount of data is not available. Randomization can be used to generate a large number of "simulated drives," from a smaller subset of actual vehicle driving data. This can be achieved by randomly sampling acceleration events from driving data sets and reordering the sample acceleration events into simulated drives. This approach may be particularly useful when optimizing methods for the computation or the third transformation angle psi, as these optimizations may rely on acceleration events.

FIG. 10 is a diagram of example components of a device 1000. The devices illustrated in FIGS. 2A and 2B, such as analysis components 220/240, may include one or more devices 1000. Device 1000 may include bus 1010, processor 1020, memory 1030, input component 1040, output component 1050, and communication interface 1060. In another implementation, device 1000 may include additional, fewer, different, or differently arranged components.

Bus 1010 may include one or more communication paths that permit communication among the components of device 1000. Processor 1020 may include a processor, microprocessor, or processing logic that may interpret and execute instructions. Memory 1030 may include any type of dynamic storage device that may store information and instructions for execution by processor 1020, and/or any type of non-volatile storage device that may store information for use by processor 1020.

Input component 1040 may include a mechanism that permits an operator to input information to device 1000, such as a keyboard, a keypad, a button, a switch, etc. Output component 1050 may include a mechanism that outputs information to the operator, such as a display, a speaker, one or more light emitting diodes ("LEDs"), etc.

Communication interface 1060 may include any transceiver-like mechanism that enables device 1000 to communicate with other devices and/or systems. For example, communication interface 1060 may include an Ethernet interface, an optical interface, a coaxial interface, or the like. Communication interface 1060 may include a wireless communication device, such as an infrared ("IR") receiver, a Bluetooth radio, or the like. The wireless communication device may be coupled to an external device, such as a remote control, a wireless keyboard, a mobile telephone, etc. In some embodiments, device 1000 may include more than one communication interface 1060. For instance, device 1000 may include an optical interface and an Ethernet interface.

Device 1000 may perform certain operations described above. Device 1000 may perform these operations in response to processor 1020 executing software instructions stored in a computer-readable medium, such as memory 1030. A computer-readable medium may be defined as a non-transitory memory device. A memory device may include space within a single physical memory device or spread across multiple physical memory devices. The software instructions may be read into memory 1030 from another computer-readable medium or from another device. The software instructions stored in memory 1030 may cause processor 1020 to perform processes described herein. Alternatively, hardwired circuitry may be used in place of or in combination with software instructions to implement processes described herein. Thus, implementations described herein are not limited to any specific combination of hardware circuitry and software.

In the preceding specification, various preferred embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

For example, while series of blocks have been described with regard to FIGS. 3-7 and 9, the order of the blocks may be modified in other implementations. Further, non-dependent blocks may be performed in parallel.

It will be apparent that example aspects, as described above, may be implemented in many different forms of software, firmware, and hardware in the implementations illustrated in the figures. The actual software code or specialized control hardware used to implement these aspects should not be construed as limiting. Thus, the operation and behavior of the aspects were described without reference to the specific software code—it being understood that software and control hardware could be designed to implement the aspects based on the description herein.

Further, certain portions of the invention may be implemented as "logic" that performs one or more functions. This logic may include hardware, such as an ASIC or a FPGA, or a combination of hardware and software.

Even though particular combinations of features are recited in the claims and/or disclosed in the specification, these combinations are not intended to limit the invention. In fact, many of these features may be combined in ways not specifically recited in the claims and/or disclosed in the specification.

No element, act, or instruction used in the present application should be construed as critical or essential to the invention unless explicitly described as such. Further, the phrase "based on" is intended to mean "based, at least in part, on" unless explicitly stated otherwise.

What is claimed is:

1. A method, implemented by one or more devices, comprising:
   receiving, by the one or more devices, acceleration measurements from a three axis accelerometer mounted in a vehicle;
   determining, by the one or more devices and based on the acceleration measurements, a dominant orientation of the accelerometer in relation to gravity, the determination of the dominant orientation including calculating a first transformation angle and a second transformation angle as parameters to perform coordinate realignment of a coordinate frame of the accelerometer to a coordinate frame of the vehicle;
   identifying, by the one or more devices and based on the acceleration measurements, an occurrence of acceleration events of the vehicle, each of the acceleration events including a plurality of acceleration measurements in which a magnitude of the plurality of acceleration measurements are greater than a threshold value;
   determining, by the one or more devices and based on an analysis of the acceleration events, a third transformation angle as a parameter to perform coordinate realignment of the coordinate frame of the accelerometer to the coordinate frame of the vehicle; and
   storing, by the one or more devices, the first, second, and third transformation angles.

2. The method of claim 1, further comprising:
   calculating, based on one of the acceleration measurements and based on the first, second, and third transformation angles, a transformed value of the one of the acceleration measurements, the transformed value measuring acceleration relating to the coordinate frame of the vehicle; and
   outputting the transformed value.

3. The method of claim 1, wherein determining the third transformation angle includes:
   analyzing the acceleration events to determine acceleration events that correspond to acceleration stopping events of the vehicle, the third transformation angle being based on the acceleration stopping events.

4. The method of claim 3, wherein the determination of the third transformation angle further includes:
   determining a set of calculated potential third transformation angles for a plurality of the acceleration events; and
   identifying a mode of the set of the calculated potential third transformation angles to determine the third transformation angle.

5. The method of claim 4, wherein identifying the mode includes:
   categorizing the set of calculated potential third transformation angles into a plurality of categories; and
   identifying the mode from the third transformation angles that are included in a category, of the plurality of categories, that corresponds to a largest number of potential third transformation angles.

6. The method of claim 3, wherein analyzing the acceleration events to determine the acceleration events that correspond to acceleration stopping events of the vehicle further includes:
   matching the acceleration events using a previously trained pattern recognition technique.

7. The method of claim 6, wherein the previously trained pattern matching technique is a pattern matching technique based on a symbolic representation of the acceleration events.

8. The method of claim 1, wherein the identified acceleration events include acceleration events that correspond to acceleration stopping events, acceleration starting events, or acceleration turning events.

9. The method of claim 1, wherein determining the dominant orientation of the accelerometer in relation to gravity includes establishing a first dominant axis of the accelerometer as defined by acceleration due to gravity being exerted greatest, a second dominant axis of the accelerometer as defined by the acceleration due to gravity being exerted next to greatest, and a third dominant axis of the accelerometer as defined by the acceleration due to gravity being least.

10. The method of claim 8, further comprising:
calculating the first transformation angle as a function of the first, second, and third dominant axes; and
calculating the second transformation angle as a function of the first and third dominant axes.

11. The method of claim 1, wherein the vehicle includes an automobile, train, plane, or motorcycle.

12. The method of claim 1, wherein determining the dominant orientation of the accelerometer in relation to gravity includes:
representing an estimate of gravity as a square root of the sum of squares of a running mean of values corresponding to the three axes of the accelerometer.

13. A system comprising:
a three axis accelerometer; and
an analysis component to:
receive acceleration measurements from the accelerometer;
determine, based on the acceleration measurements, a dominant orientation of the accelerometer in relation to gravity, the determination of the dominant orientation including calculating a first transformation angle and a second transformation angle as parameters to perform coordinate realignment of a coordinate frame of the accelerometer to a coordinate frame of a vehicle in which the accelerometer is placed;
identify occurrences of acceleration events of the vehicle;
calculate, based on select ones of the acceleration events, a third transformation angle as a parameter to perform coordinate realignment of the coordinate frame of the accelerometer to the coordinate frame of the vehicle;
calculate, based on one of the acceleration measurements and based on the first, second, and third transformation angles, a transformed value of the one of the acceleration measurements, the transformed value measuring acceleration relative to the coordinate frame of the vehicle; and
output the transformed value.

14. The system of claim 13, wherein the selected ones of the acceleration events are determined based on an application of pattern recognition techniques to the identified occurrences of the acceleration events of the vehicle.

15. The system of claim 14, wherein, in applying the pattern recognition techniques, the analysis component is further to:
convert the acceleration measurements into a symbolic representation by dividing magnitude values corresponding to the acceleration measurements into a first plurality of ranges;
convert sampling times associated with the acceleration measurements into a second plurality of ranges; and
assign a symbolic representation corresponding to the first plurality of ranges and the second plurality of ranges.

16. The system of claim 15, wherein, in applying the pattern recognition techniques, the analysis component is further to:
store a predetermined indication of one or more patterns corresponding to acceleration events that correspond to a stopping event of the vehicle.

17. The system of claim 13, wherein determining the dominant orientation of the accelerometer in relation to gravity includes establishing a first dominant axis of the accelerometer as defined by acceleration due to gravity being exerted greatest, a second dominant axis of the accelerometer as defined by the acceleration due to gravity being exerted next to greatest, and a third dominant axis of the accelerometer as defined by the acceleration due to gravity being least.

18. The system of claim 17, wherein the analysis component is further to:
calculate a first transformation angle as a function of the first, second, and third dominant axes; and
calculate the second transformation angle as a function of the first and third dominant axes.

19. The system of claim 17, wherein the analysis component is further to:
determine a set of calculated potential third transformation angles for the acceleration events;
identify a mode of the set of the calculated potential third transformation angles;
determine the select ones of the acceleration events based on the mode.

20. A device comprising:
an accelerometer to generate acceleration measurements; and
an analysis component to:
determine, based on the acceleration measurements, a dominant orientation of the accelerometer in relation to gravity, the determination of the dominant orientation including calculating a first transformation angle and a second transformation angle as parameters to perform coordinate realignment of a coordinate frame of the accelerometer to a coordinate frame of a vehicle;
identify, based on the acceleration measurements, an occurrence of acceleration events of the vehicle, each of the acceleration events including a plurality of acceleration measurements;
determine, based on an analysis of the acceleration events, a third transformation angle as a parameter to perform coordinate realignment of the coordinate frame of the accelerometer to the coordinate frame of the vehicle; and
store the first, second, and third transformation angles.

21. The device of claim 20, wherein the analysis component is further to:
calculate, based on one of the acceleration measurements and based on the first, second, and third transformation angles, a transformed value of the one of the acceleration measurements, the transformed value measuring acceleration relating to the coordinate frame of the vehicle; and
output the transformed value.

22. The device of claim 20, wherein the analysis component, when determining the third transformation angle, is further to:
analyze the acceleration events to determine acceleration events that correspond to acceleration stopping events of the vehicle, the third transformation angle being based on the acceleration stopping events.

23. The device of claim 22, wherein the analysis component, when determining the third transformation angle further, is further to:
determine a set of calculated potential third transformation angles for a plurality of the acceleration events; and
identify a mode of the set of the calculated potential third transformation angles to determine the third transformation angle.

24. The device of claim 22, wherein when analyzing the acceleration events to determine the acceleration events that correspond to acceleration stopping events of the vehicle further, the analysis component is further to:
match the acceleration events using a previously trained pattern recognition technique.

* * * * *